United States Patent
Gallet

(10) Patent No.: US 8,696,303 B2
(45) Date of Patent: Apr. 15, 2014

(54) FEATHERING DEVICE FOR THE FAN BLADES OF A TURBOPROP ENGINE

(75) Inventor: Francois Gallet, Paris (FR)

(73) Assignee: SNECMA, Paris (FR)

( * ) Notice: Subject to any disclaimer, the term of this patent is extended or adjusted under 35 U.S.C. 154(b) by 461 days.

(21) Appl. No.: 13/073,139

(22) Filed: Mar. 28, 2011

(65) Prior Publication Data

US 2011/0236212 A1    Sep. 29, 2011

(30) Foreign Application Priority Data

Mar. 29, 2010 (FR) ..................................... 10 52287

(51) Int. Cl.
*F01D 21/12* (2006.01)

(52) U.S. Cl.
USPC ................. 415/48; 416/39; 416/155; 416/164

(58) Field of Classification Search
USPC ........ 415/12, 48, 129; 416/39, 147, 155, 163, 416/164, 167, 168 R, 168 A
See application file for complete search history.

(56) References Cited

U.S. PATENT DOCUMENTS

| | | | |
|---|---|---|---|
| 2,118,652 A | | 5/1938 | Meijer |
| 3,792,937 A | | 2/1974 | Chilman |
| 4,586,335 A | * | 5/1986 | Hosoda et al. .................. 60/528 |
| 5,685,694 A | * | 11/1997 | Jones et al. .................... 416/147 |
| 5,795,132 A | * | 8/1998 | Wheeler ........................ 416/147 |
| 6,077,040 A | * | 6/2000 | Pruden et al. ................... 416/45 |
| 2009/0180876 A1 | | 7/2009 | Muhlbauer |

FOREIGN PATENT DOCUMENTS

| | | |
|---|---|---|
| DE | 41 19 810 A1 | 12/1992 |
| EP | 2 050 670 A2 | 4/2009 |
| FR | 2.112.447 | 6/1972 |

OTHER PUBLICATIONS

French Preliminary Search Report issued Dec. 3, 2010, in French 1052287, filed Mar. 29, 2010 (with English Translation of Categories of Cited Documents).

* cited by examiner

*Primary Examiner* — Edward Look
*Assistant Examiner* — William Grigos
(74) *Attorney, Agent, or Firm* — Oblon, Spivak, McClelland, Maier & Neustadt, L.L.P.

(57) ABSTRACT

A feathering device for the fan blades of a turboprop engine that includes at least one set of fan blades with adjustable orientation is provided. The assembly is attached in rotation to a rotating cowling connected to a turbine rotor. Each blade is coupled, for the adjustment of its orientation, to a control ring that is movable between two extreme positions, one of which corresponds to feathering of the blades. Mechanical parts are able to extend elastically as a result of a rise in their temperature, these mechanical parts being positioned facing the control ring so as to be able to exert a thrust force on the ring in order to put it in a position to feather the blades when they expand. A device to cause a rise in the temperature of the mechanical parts so as to expand them is also provided.

11 Claims, 3 Drawing Sheets

FEATHERING DEVICE FOR THE FAN BLADES OF A TURBOPROP ENGINE

BACKGROUND OF THE INVENTION

This present invention relates to the general area of turboprop engines. More particularly, it concerns feathering the fan blades of a turboprop engine.

In a manner that is known, a turboprop engine includes at least one set of fan blades that is driven in rotation by a turbine rotor. These fan blades have the particular feature of being of the variable-pitch type, meaning that their angular orientation can be altered in order to optimally control the thrust of the turboprop engine and the speed of rotation of the propellers. To this end, the mechanisms to control the orientation of the fan blades generally include a hydraulic actuator that is coupled to the blades and in which the position of the rod on the movement trajectory of the actuator determines the angular orientation of the blades.

In addition, on a turboprop engine, in the event of failure of the turboprop engine and/or of the control mechanism for orientation of the fan blades, it is necessary, for safety reasons, to align the blades of the turboprop engine in the direction of the air flow so as to limit drag. We also speak of feathering or putting the blades into minimum incidence position.

Feathering of the blades of a turboprop engine is generally performed by a device that is independent of the control mechanism for orientation of the fan blades, and that is used to force the blades to align themselves in the direction of the airflow. Such a device is usually composed of an individual hydraulic circuit, that is with its own pump and its own control, which operates the actuator of the control mechanism for orientation of the blades up to the travel limit stop of the latter, where this travel limit stop corresponds to feathering of the blades. A feathering device of this type is particularly complex to create however, is not very reliable, and is difficult to incorporate into a two-propeller aircraft turboprop engine. Apart from this, such a mechanism cannot be used to feather the blades in the event of failure of the actuator (in fact, it is precisely the actuator that operates the blades in order to feather them).

PURPOSE AND SUMMARY OF THE INVENTION

The main aim of this present invention is therefore to get around such drawbacks by proposing a reliable and simplified feathering device.

This aim is achieved by means of a feathering device for the fan blades of a turboprop engine comprising at least one set of fan blades with adjustable orientation, said assembly being attached in rotation to a rotating cowling that is centred on a longitudinal axis and connected mechanically to a turbine rotor, with each blade of the assembly being coupled, for the adjustment of its orientation, to a control ring centred on the longitudinal axis and housed within the rotating cowling, the control ring being movable longitudinally between two extreme positions, one of which corresponds to feathering of the blades. According to the invention, this device further comprises mechanical parts that are able to extend elastically as a result of a rise in their temperature, these mechanical parts being fitted inside the rotating cowling substantially parallel to the longitudinal axis and positioned facing the control ring so as to be able to exert a thrust force on the synchronisation ring in order to put it in a position to feather the blades when they expand, and means to cause a rise in the temperature of the mechanical parts so as to expand them.

The presence of simple mechanical parts that are able to extend elastically as a result of a rise in their temperature allows one to considerably simplify the feathering device of the blades, and this makes it easy to incorporate into a double-propeller aircraft turboprop engine. Apart from this, this device provides high reliability, since it notably does not have a hydraulic circuit. Finally, the mass of this device is low in relation to a device using an individual hydraulic circuit.

It is preferable that the mechanical parts comprise a plurality of helical springs made from a shape-memory material.

The means to cause a rise in the temperature of the springs may comprise an electrical circuit connected to the springs and powered by an electric generator. Alternatively, these means may comprise a hot-air circuit opening into the rotating cowling and powered by air coming from a compression section of the turboprop engine.

The means to cause a rise in the temperature of the mechanical parts are advantageously controlled by an electronic computer in the turboprop engine.

For its movement, the control ring may be coupled to the rod of an actuator centred on the longitudinal axis.

Advantageously, the device further comprises blade-root supports mounted to pivot on the rotating cowling and each connected to the control ring by means of an eccentric lug.

The invention also has for object a turboprop engine comprising a feathering device for the fan blades as defined above.

BRIEF DESCRIPTION OF THE DRAWINGS

Other characteristics and advantages of this present invention will emerge from the description that follows, with reference to the appended drawings which illustrate one example of implementation that is free of any limiting character. In the figures.

DETAILED DESCRIPTION OF ONE METHOD OF IMPLEMENTATION

Figure 1:
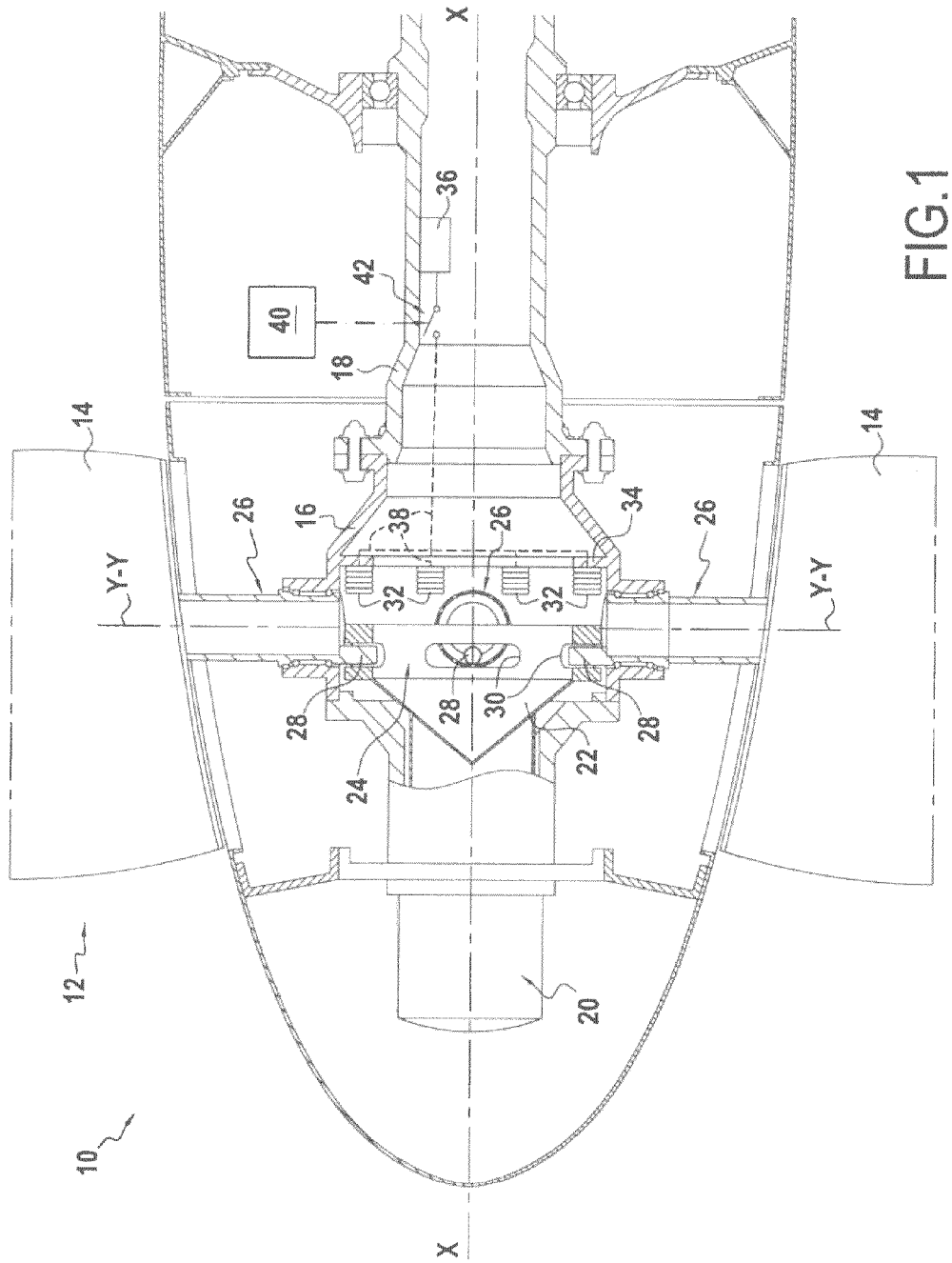
FIG. 1 is a partial view in longitudinal section of a turboprop engine equipped with a feathering device according to the invention.

In a partial and schematic manner, FIG. 1 shows an example of implementation of an aircraft turboprop engine of the single propeller type. Naturally, the invention also applies to other types of turboprop engine, and in particular to turboprop engines with counter-rotating double propellers.

The turboprop engine 10 represented in FIG. 1, with longitudinal axis X-X, includes in particular a propeller 12 formed of a set of fan blades 14 with adjustable orientation. This set of blades is attached in rotation to an annular cowling 16 centred on the longitudinal axis X-X, the latter being connected mechanically to a shaft of the turbine rotor 18 that drives it in rotation.

The turboprop engine also includes a device for controlling the orientation of the blades 16 of the propeller. This device comprises in particular an actuator 20 (of the hydraulic, pneumatic or electric type) centred on the longitudinal axis X-X, and of which the rod 22 is attached to a control and synchronisation ring 24 that is housed within the rotating cowling 16 coaxially with the latter. In addition, each blade 16 is coupled to a blade-root support 26 that is mounted to pivot on the rotating cowling 16.

The control ring 24 fits into these blade-root supports 26 to pivot the set of the blades around their respective longitudinal axes Y-Y, in the following manner. The blade-root supports each includes a lug 28 (or finger) which is eccentric in relation to their axes of rotation, Y-Y, and positioned radially to the longitudinal axis, X-X, of the turboprop engine.

Figure 2A:
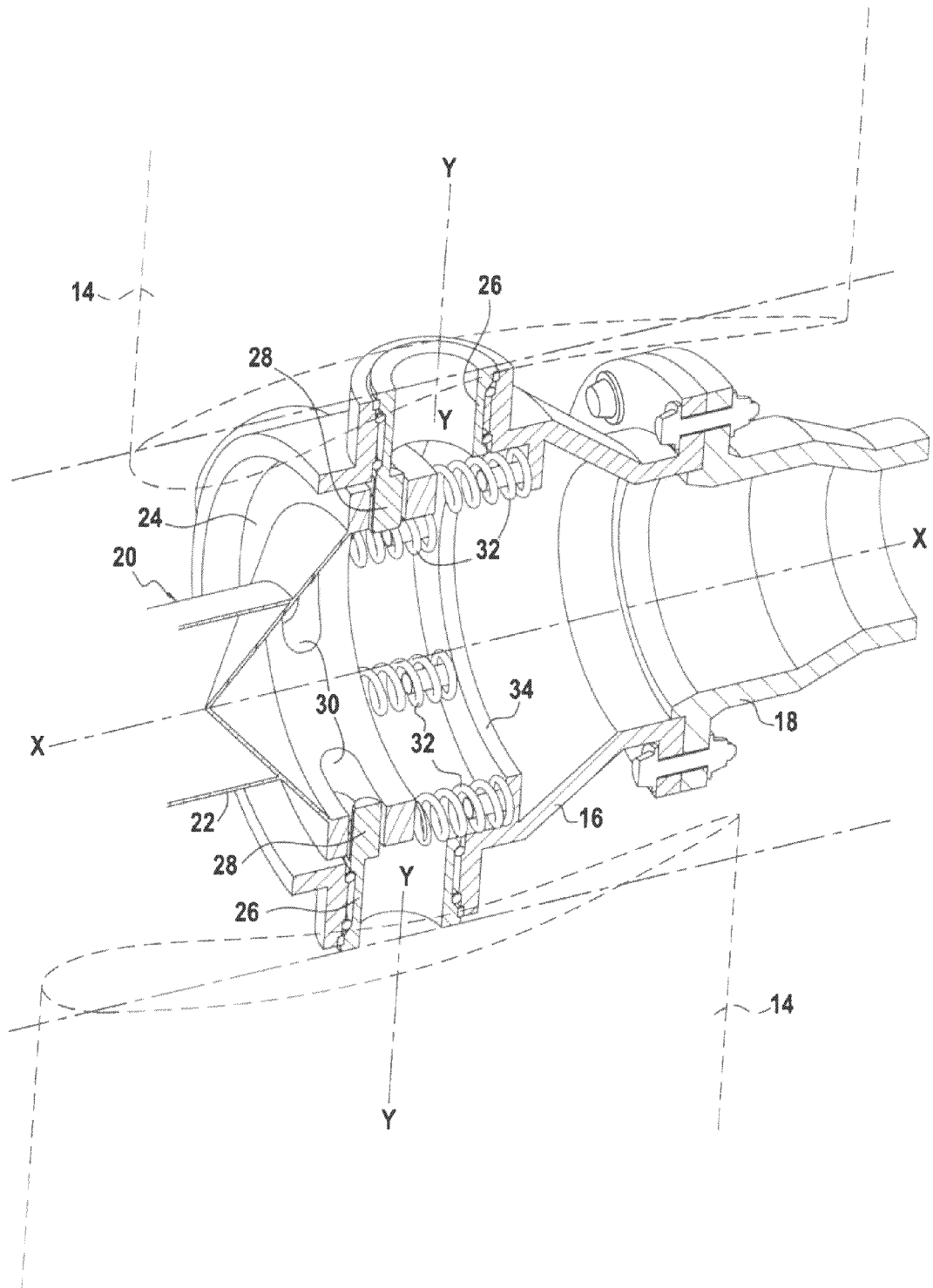
FIGS. 2A and 2B show a feathering device according to the invention, in two extreme positions.
Figure 2B:
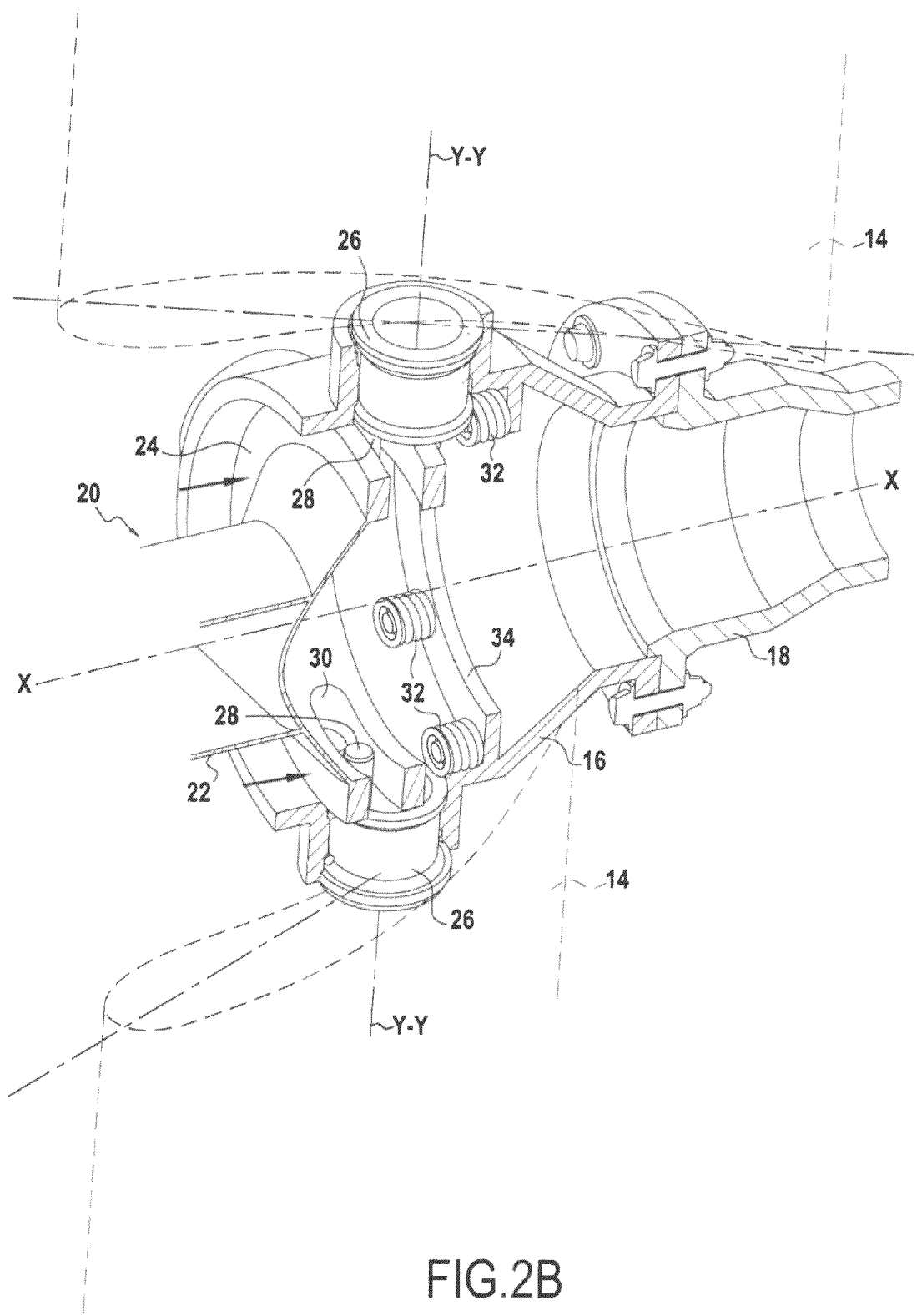

As shown more precisely in FIGS. 2A and 2B, these lugs 28 can slide inside tangential slots 30 created in the rod 22 of the actuator, at the free end of the latter. As a consequence, a longitudinal movement of the rod 22 of the actuator causes synchronised pivoting of the blade-root supports 24 around their respective axes of rotation, Y-Y.

Naturally, it is possible to imagine different implementations for synchronised control of the orientation of the propeller blades. In particular, rather than providing slots that fit onto the lugs of the blade-root supports, the rod of the actuator could pivot around the longitudinal axis of the turboprop engine at the same time as its longitudinal movement. In this case, the lugs of the blade-root supports would be mounted in simple cylindrical holes created in the rod of the actuator.

Different settings of the blades of the turboprop engine can thus be achieved by longitudinally moving the rod 22 of the actuator 20 between two extreme positions.

In particular, FIG. 2A represents the rod of the actuator in one of these extreme positions (the upstream position) which corresponds to feathering (or placement in the position of minimum incidence) of the blades. The device used to cause movement of the rod of the actuator into this extreme upstream position, and to achieve feathering of the blades, is described later.

FIG. 2B represents placement of the blades in the flight position, in which the latter are oriented to create thrust. In relation to the feathering position, the blade-root supports have pivoted here through about a quarter turn around their respective axes of rotation.

The turboprop engine also includes a feathering device for the blades of the propeller. In the event of failure of the turboprop engine and/or of the device for controlling the orientation of the blades, such a device is used to align the blades of the turboprop engine in the direction of the airflow so as to limit drag.

According to the invention, the feathering device for the blades of the turboprop engine in particular includes a plurality of helical springs 32 that are mounted on an annular flange 34 of the rotating cowling 16 and inside the latter. These springs, which are distributed regularly around the longitudinal axis X-X of the turboprop engine have one of their ends fixed to the flange 34 of the cowling. They extend longitudinally from this flange in the upstream direction. They are also positioned so that their free end is facing the free end of the rod 22 of the actuator 20 of the device for controlling the orientation of the blades.

The springs 32 are of the type that are able to extend elastically as a result of a rise in their temperature. In a manner that is advantageous, it is possible, for this purpose, to choose metal springs made from a shape-memory material (nitinol for example) with a threshold temperature $T_S$ that is greater than the maximum temperature experienced by the springs during a mission. By way of an example, this threshold temperature $T_S$ can be around 150° C.

In the case of using a shape-memory material, a cold position will be chosen first (that is a position of use at a temperature that is less than the threshold temperature $T_S$) at which the springs will be compressed (turns touching). However this compressed position of the springs must not impede the longitudinal movement of the rod 22 of the actuator 20 (FIG. 2B). The rise in the temperature of the springs above the threshold temperature $T_S$ will result in an expansion of the springs that will be calibrated so as to exert a thrust force on the rod 22 of the actuator in order to move it to its extreme upstream position corresponding to feathering of the blades (FIG. 2A).

If one makes use, for the implementation of the springs, of a shape-memory material of the "double direction" type, then the springs are capable of recovering their initial compressed shape once their temperature returns below the threshold temperature $T_S$. It is possible however to use a shape-memory material of the "single direction" type, in which case the springs would have to be replaced after they have been extended. In this case, the springs will be advantageously mounted in the rotating cowling in the form of a single removable block.

Different mechanisms can be used to cause a rise in the temperature of the springs 32 above the threshold temperature $T_S$ so as to expand them.

Thus, in the method of implementation of FIG. 1, this rise in temperature is achieved by the passage of an electric current in the metal springs. To this end, use can be made of the electrical circuit already employed for de-icing or defrosting of the turboprop engine. Such a circuit is mounted inside the rotating cowling 16 and supplied with electrical power from an electric generator 36.

More precisely, as shown in particular in FIG. 1, the springs 32 are each connected by an electrical wire 38 to the electric generator 36 of this defrosting circuit, and the electronic computer 40 of the turboprop engine is used to operate a switch 42 placed on the line between the springs and the electric generator. The springs 32 are thus heated by Joule effect due to the electric current flowing in them.

This method of implementation has the advantages of using an electrical circuit that already exists, in order to cause a rise in the temperature of the springs.

In another method of implementation of the invention not shown in the figures, the rise in the temperature of the springs is achieved by directing hot air onto the springs, where this hot air is taken from the air flow in the turboprop engine, from the high-pressure compressor of the latter for example. To this end, it is possible to use a hot-air circuit that opens out as a scoop in the path of the gaseous flow passing through the high-pressure compressor of the turboprop engine and opening into the rotating cowling in the vicinity of the springs. A valve mounted on this hot-air circuit and controlled by the electronic computer in the turboprop engine can be used to control/monitor the flow of hot air directed onto the springs.

This other method of implementation presents the advantages that all the springs are subjected to the same temperature at the same time so that there is no danger of a single blade being feathered on its own.

The invention has been described above in relation to a turboprop engine with a turbine that is connected directly to the propeller. Naturally, the invention also applies to turboprop engines with single or double propellers, the propellers of which are driven via a planetary type gearbox.

The invention claimed is:

1. A feathering device for the fan blades of a turboprop engine comprising at least one set of fan blades with adjustable orientation, the feathering device comprising:
   an actuator centered on a longitudinal axis and including a rod;
   a control ring attached to the rod and centered on the longitudinal axis; and
   a rotating cowling centered on the longitudinal axis and connected mechanically to a turbine rotor,
   wherein the rotating cowling houses the control ring, wherein each blade-root support of each fan blade is pivotably mounted on the rotating cowling, and each blade-root support of each fan blade is coupled to the control ring to adjust the orientation of each fan blade, the control ring being movable longitudinally between first and second positions in which the first position corresponds to feathering of the blades, wherein a plurality of extendable mechanical parts are each mounted between the control ring and a seat secure to the rotating cowling inside the rotating cowling, the plurality of extendable mechanical parts being substantially parallel to the longitudinal axis and positioned facing the control ring, and the plurality of extendable mechanical parts expanding and extending elastically from a compressed position at a threshold temperature so as to exert a thrust force on the control ring to put the control ring in the first position to feather the blades when the plurality of expandable mechanical parts expands, and wherein a temperature increasing device is provided to increase the temperature of the plurality of expandable mechanical parts to the threshold temperature so as to expand the plurality of expandable mechanical parts.

2. The device according to claim 1, wherein the plurality of expandable mechanical parts comprises a plurality of helical springs made from a shape-memory material.

3. The device according to claim 2, wherein said temperature increasing device comprises an electrical circuit connected to the springs and powered by an electric generator.

4. The device according to claim 2, wherein said temperature increasing device comprises a hot-air circuit opening into the rotating cowling and powered by air coming from a compression section of the turboprop engine.

5. The device according to claim 1, wherein said temperature increasing device is controlled by an electronic computer of the turboprop engine.

6. The device according to claim 1, wherein each blade-root support is connected to the control ring by an eccentric lug.

7. A turboprop engine comprising a feathering device for the fan blades according to claim 1.

8. The device according to claim 2, wherein the springs in the compressed position do not interfere with longitudinal movement of the rod of the actuator.

9. The device according to claim 2, wherein the shape-memory material is single direction shape-memory material.

10. The device according to claim 2, wherein the shape-memory material is a double direction shape-memory material.

11. The device according to claim 6, wherein the lug is slidable inside tangential slots provided in the rod of the actuator.

* * * * *